United States Patent [19]

Jones

[11] 4,301,047

[45] Nov. 17, 1981

[54] FREE-FLOWING POLYOLEFIN MOLDING COMPOSITION OF HIGH FILLER CONTENT, PROCESS FOR ITS MANUFACTURE AND ITS USE

[75] Inventor: Barry M. Jones, Frankfurt am Main, Fed. Rep. of Germany

[73] Assignee: Hoechst Aktiengesellschaft, Frankfurt am Main, Fed. Rep. of Germany

[21] Appl. No.: 129,719

[22] Filed: Mar. 12, 1980

[30] Foreign Application Priority Data

Mar. 14, 1979 [ES] Spain .................................... 478.625

[51] Int. Cl.$^3$ .............................................. C08L 1/00
[52] U.S. Cl. ............................ 260/17.4 R; 260/42.46
[58] Field of Search ...................... 260/42.46, 17.4 R

[56] References Cited

U.S. PATENT DOCUMENTS

| 3,810,799 | 5/1974 | Rager et al. | 260/42.46 |
| 4,039,507 | 8/1977 | Paige et al. | 260/17.4 R |
| 4,120,844 | 10/1978 | Meyer et al. | 260/42.46 |
| 4,165,302 | 8/1979 | Armenti et al. | 260/17.4 R |

*Primary Examiner*—Lewis T. Jacobs
*Attorney, Agent, or Firm*—Curtis, Morris & Safford

[57] ABSTRACT

Free-flowing polyolefin molding compositions having a very high filler content are obtained, if instead of the individual fillers there is used a mixture of wood flour and chalk or talc.

5 Claims, No Drawings

FREE-FLOWING POLYOLEFIN MOLDING COMPOSITION OF HIGH FILLER CONTENT, PROCESS FOR ITS MANUFACTURE AND ITS USE

The invention relates to free-flowing polyolefin molding compositions having a high filler content which may be injection molded or extruded without difficulty.

The addition of fillers to polyolefins has already been common for a long time. Depending on the kind of the filler, said addition results in an improvement of certain properties or a reduction in price of the polyolefin molding composition and the articles made thereof.

In recent times it has become a common practice to process polyolefins directly from the powder by injection molding or extrusion, in order to save the granulation step. For this purpose, favorable flow properties of the molding composition ready for processing are absolutely necessary, as otherwise an even charging of the processing machine cannot be ensured.

For many application purposes a high proportion of price-reducing fillers as additives to polyolefins is desirable, for otherwise the high price adversely affects the utilization of the polyolefin molding compositions in spite of their favorable properties. Inexpensive fillers are, for example, chalk and talc. It has become evident, however, that with an amount of additives exceeding 20% by weight the molding compositions do no longer show a sufficient flow capacity. Due to bridge formation in the feeding zone of the processing machine there is an irregular transport of the material which makes a satisfactory processing impossible. When using wood flour which is like-wise inexpensive, a maximum proportion of 30% may be added, since the wood flour involves an increase of the viscosity of the mixture, thus resulting in burn spots due to the necessary increase of the processing temperature.

There has thus been a demand for a free-flowing polyolefin molding composition having a high filler content.

It has now been found that a high filler content may be achieved by using a mixture of wood flour and chalk or talc.

The subject of the present invention is therefore the polyolefin molding composition mentioned in the claims, its manufacture and its use.

The free-flowing polyolefin molding composition of a high filler content according to the invention contains from 40 to 60, preferably 45 to 55% by weight of polyolefin powder and from 60 to 40, preferably 55 to 45% by weight of a filler mixture which contains in its turn from 30 to 75, preferably 40 to 60, parts by weight of wood flour and from 70 to 25, preferably 60 to 40, parts by weight of chalk or talc.

This molding composition shows favorable flow properties and may be processed even at lower temperatures than pure polyolefin, so that there are no burn spots. As against pure polyolefins, the molding composition of the invention has the advantage of showing low shrinkage values and being free from warping and sunk spots, which results in an accelerated processing cycle.

For the molding composition of the invention there are suitable polyethylene of a high, medium and low density as well as polypropylene. Use may also be made of crystalline copolymers of ethylene having up to 15% by weight of propylene or of propylene having an ethylene content of up to 15% by weight, furthermore copolymers of ethylene or propylene with up to 15% by weight of a higher 1-olefin, for example butene-1 or hexane-1 or up to 5% by weight of other copolymerizable monomers, for example acrylates or vinyl compounds, as well as mixtures which predominantly contain these copolymers.

There are preferably employed polypropylene or mixtures of polypropylene with from 1 to 5% by weight of polyethylene having a medium or low density, especially high-pressure polyethylene.

The wood flour to be employed has a particle size of from 200 to 700, preferably 300 to 500 μm. There is preferably used pine wood flour. The moisture content of the wood flour should be less than 0.4, preferably less than 0.3% by weight. As chalks there are used above all fine-grain types having an average particle diameter of from 1 to 5 μm. The chalk should preferably not contain any coarse particles with a diameter of more than 20 μm, better not more than 10 μm. The talc to be employed should have an average particle size of from 1 to 50, preferably from 5 to 40 μm.

Besides the fillers, the molding composition of the invention contains the common polyolefin stabilizers, for example phenols and/or sulfidic compounds, besides optionally pigments, lubricants, light stabilizers, flame retardants, etc.

The molding composition of the invention may be processed directly by injection molding or extrusion. Extruded panels may be deep drawn in an excellent manner. The inexpensive molding composition having a high filler content is employed above all in those cases where the pure polyolefins are too expensive, for example for non-deposit fruit and vegetable lugs. It is also suitable for other injection molded parts, such as parts for the passenger compartment of motor vehicles, for example deposit panels, instrument panels, switch boards, handles or buttons, or for relatively thick injection molded parts, such as W.C. seats and covers or small parts, for example clothes-pegs.

The following Examples illustrate the invention.

EXAMPLE 1

In a mixer there are mixed 30 parts by weight of pine wood flour having an average particle size of 350 μm and a moisture content of less than 0.4% by weight, with 20 parts by weight of chalk having an average particle size of 3 μm which does not contain any particles having a diameter of more than 10 μm, 25 parts by weight of a polypropylene having a melt flow index MFI 230/5 (determined according to DIN 53 735) of 1.5 g/10 min and 25 parts by weight of a polypropylene having a melt flow index MFI 230/5 of 12 g/10 min. As stabilizing agents and lubricants there are added 0.2% by weight of n-octadecyl-β-(4'-hydroxy-3',5'-di-tert. butylphenyl)-propionate and 0.2% by weight of calcium stearate, each calculated on the mixture.

The composition is injection molded in an injection molding machine to give W.C. seat covers having a weight of 2 kg. The first cycles are carried out with the temperature program of 200° C. in the feeding zone, 215° C. in the melting zone and 230° C. at the nozzle, as is common for polypropylene. The injection molded parts have an uneven surface, while showing slight burn spots. Thereupon the temperature is reduced. With a temperature program of 170°/175°/185° C., excellent injection molded parts having a smooth surface can be prepared, which do not show any burn spots. The composition has very favorable flow properties and may be processed without difficulty. Even after a continuous operating period of 8 hours, no deposits are found at the screw or nozzle. Due to the low processing temperature there is no risk of burning the wood flour, and the injection molding cycle may be reduced from 8 minutes (for pure polypropylene) to 3 minutes.

EXAMPLES 2 to 5

The compositions indicated in the Table are stabilized and processed as has been described in Example 1.

| Example | | 2 | 3 | 4 | 5 |
|---|---|---|---|---|---|
| Polypropylene, MFI 2.5g/10min | parts by wt. | 50 | 55 | 43 | 55 |
| High-pressure polyethylene | " | — | — | 2 | — |
| Pine wood flour | | | | | |
| Aver. particle size 650 μm | " | 25 | 25 | 35 | 30 |
| Chalk, aver. particle size 2 μm | " | — | — | 20 | 15 |
| Talc, aver. particle size 10 μm | " | 25 | 20 | — | — |

All compositions have very favorable flow properties and may be processed without difficulty with the same temperature program as in Example 1 to give injection molded parts showing a smooth surface and no sunk spots.

What is claimed is:

1. A free-flowing polyolefin molding composition having a high filler content and containing from 40 to 60% by weight of polyolefin powder and from 60 to 40% by weight of a filler mixture of from 30 to 75 parts by weight of wood flour and from 70 to 25 parts by weight of chalk or talc.

2. Polyolefin molding composition as claimed in claim 1, which contains from 45 to 55% by weight of polyolefin powder and from 55 to 45% by weight of the filler mixture.

3. Polyolefin molding composition as claimed in claims 1 or 2, wherein the filler mixture contains from 40 to 60 parts by weight of wood flour and from 60 to 40 parts by weight of chalk or talc.

4. Polyolefin molding composition as claimed in claims 1, 2 or 3, which contains polypropylene as polyolefin.

5. Polyolefin molding composition as claimed in claims 1, 2, 3 or 4, which contains as wood flour pine wood flour having a particle size of from 200 to 700 μm

* * * * *